United States Patent [19]
Chatten

[11] Patent Number: 4,841,914
[45] Date of Patent: Jun. 27, 1989

[54] METHOD AND APPARATUS FOR DETERRING BIRDS

[76] Inventor: Victor Chatten, 1567 W. 215th St., Torrance, Calif. 90501

[21] Appl. No.: 76,896

[22] Filed: Jul. 23, 1987

[51] Int. Cl.[4] ........................ A01K 15/04; E04H 9/16
[52] U.S. Cl. ................................................ 119/97 AR
[58] Field of Search .................... 119/97 AR; 256/11; 52/101

[56] References Cited

U.S. PATENT DOCUMENTS 2,258,803 10/1941 Peles ................................ 256/11 X
2,304,593 12/1942 Peles ................................ 256/11 X
2,456,731 12/1948 Peles .................................... 52/101
2,938,244 5/1960 Christensen ...................... 256/11 X

*Primary Examiner*—Robert P. Swiatek
*Attorney, Agent, or Firm*—Lyon & Lyon

[57] ABSTRACT

Undesirable bird perches are eliminated by attaching to the perch location a small gauge wire in a spiral shape, the wire being of sufficiently light gauge so as not to stably support the birds utilizing the perch, but of sufficiently heavy gauge, and the individual spirals being of proper size and spacing so as to interfere with the bird's ability to alight comfortably on the perch location.

13 Claims, 1 Drawing Sheet

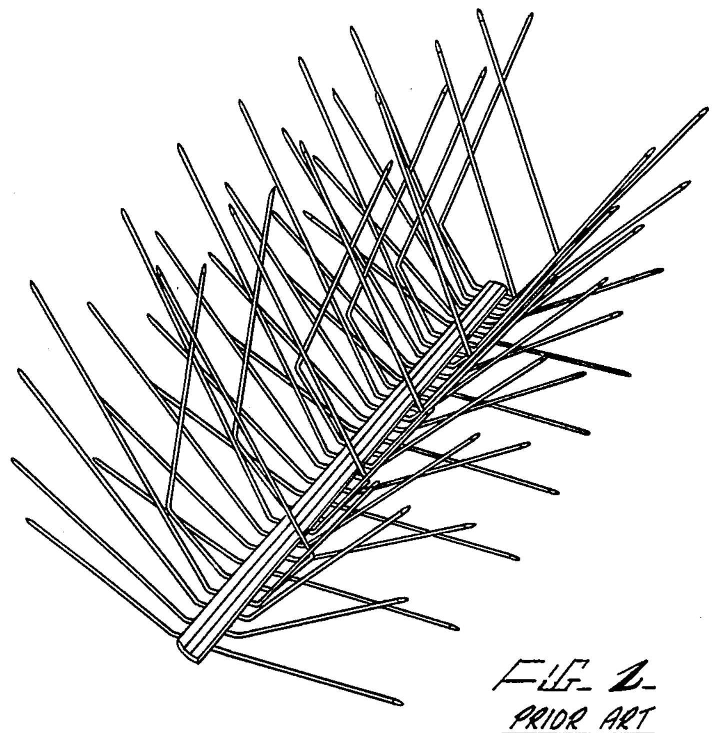
FIG_2_
PRIOR ART
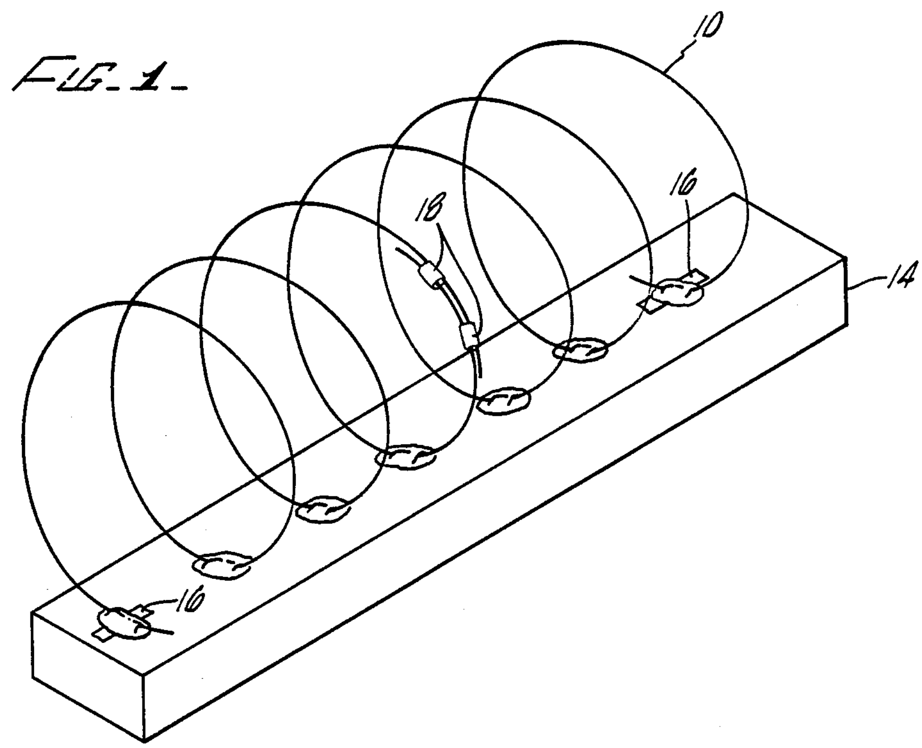
FIG_1_
10
18
16
14
16

METHOD AND APPARATUS FOR DETERRING BIRDS

BACKGROUND

1. Field of the Invention

This invention relates to mechanical apparatus and a method for constructing same for deterring birds from landing at undesirable locations.

2. Prior Art

Because of the noises they can make, and the mess they can leave behind, birds are not always welcomed. Private as well as public areas can be rendered unsightly and unusable because birds have chosen a nearby overhead position as a favorite perch. The nuisance created by the birds can also be unhealthy as diseases carried in fungi in bird droppings can be communicated to humans. These problems and others can affect the small private residence as well as the large corporate skyscrapers, and every type, size and shape structure inbetween.

In some areas, the pigeon is the primary offending bird. Along the coastlines, seagulls are most troublesome. In other areas, starlings, sparrows, swallows and blackbirds are most often the problem, although there are countless species that can be the culprit.

For these reasons, numerous methods and devices have been utilized and devised to keep birds away. Mock predators, such as owls, hawks or snakes have been erected. Some of these have been quite sophisticated, built to move periodically and to emit sound. But the birds usually quickly discover the ruse, and return, actually perching on their mortal enemy model.

Others have resorted to real-life predators, using peregrine falcons, for example, to disburse pigeons. These real predators, however, are expensive, indiscriminate, unreliable and largely ineffective.

Others have attempted to use a noise deterrence, emitting a reoccurring sharp report to scare the birds away. This, too, is only minimally effective, as the birds become quickly accustomed to the noise. Further, this method is not useful around humans, as the sound is as noisome to them as to the birds.

Other devices and methods which have been employed to combat the bird problem include a gel which is applied to the perch area, giving the bird a chemical hot-foot when it lands in the goo. Ultrasound emitters designed to irritate the birds are also available. These all have drawbacks. The chemical gel is sticky, and therefore dust, dirt and small objects adhere to it, making it unsightly. Also it loses it effectiveness over time. The ultrasound emitters are expensive, need a power source, and are of only limited effectiveness in open areas.

The most utilized prior art device is that shown in the drawings appended hereto as FIG. 2 and labelled as prior art. This devices comprises a continuous metal spine from which protrude a repetitive pattern of pointed prongs. This device is affixed by screws or nails to those areas where the birds would unwantedly perch. Any bird with the temerity to attempt to land on this device painfully realizes his folly.

While this device has proven effective, it is subject to several drawbacks. First, it can be injurious to the birds, as bloodied feet and impaled wings are not unusual. Second, it is potentially injurious to humans who unexpectedly come into contact with it. Third, it is relatively expensive. Fourth, it is somewhat unsightly and harsh in appearance. Fifth, papers and leaves can become impaled upon its tines, creating an eyesore.

Lastly, some people have even resulted to the ultimate sanction, actually killing large numbers of the offending birds in an attempt to frighten them off. This, of course, is highly disfavored as a deterrence means, but it is indicative of the levels of frustration experienced when an area goes literally "to the birds".

Accordingly, there has existed and continues to exist a need for an improved, effective way to deter birds from landing in certain areas.

SUMMARY OF INVENTION

The method and apparatus of this invention provide such an effective alternative in an expanded-coil wire spiral which is affixed to those areas where deterrence to perching is desired. The wire must be of large enough gauge, and the coils sufficiently closely spaced, such that the wire interferes with the wings of the bird as it attempts to land. This causes the bird benign discomfort such that it immediately takes flight. In some instances, the birds appear confused by the spiral shape and refuse to land.

This method and apparatus has proven completely effective in deterring birds from landing at long-time favorite perches. For example, at the inventor's residence, an outdoor patio area had been rendered unusable by the residue left by the birds which constantly perched on the adjacent building structure. After installation of this invention, not a single drop of bird residue has been found for over 6 months. Moreover, because the invention consists essentially of a single strand of small gauge wire which is typically affixed to a location overhead, it is unnoticed by the casual observer. It also poses no threat of injury to the bird or to humans who might unwittingly come into contact with it, and is far less expensive than the prior art devices. It does not attract or collect dirt, dust, leaves, papers, etc., as do some of the prior art devices. It is also effective to deter cats and other small animals. Moreover, the high flexibility of the invention makes it ideal for use on statues and other structures which are irregularly shaped.

Although this invention is simple, that simplicity is the hallmark of true invention, not obviousness.

DESCRIPTION OF THE FIGURES

FIG. 1 is a perspective view of the apparatus of this invention.

FIG. 2 is a perspective view of a prior art bird deterrence apparatus.

DESCRIPTION OF THE PREFERRED EMBODIMENT

The device of this invention consists essentially of two parts—the wire 10 and the means 12 for affixing the wire to the perch area 14.

The wire 10 is a coiled stainless steel wire extended to form a spiral shape. A wire having a thickness of 0.025 inches and a coil diameter of 3½ inches has been found useful with the smaller bird species such as starlings, sparrows, blackbirds and the like. For this size bird, the coils are spread apart approximately 2 inches.

For bigger birds, such as pigeons, seagulls and the like, a thicker wire (0.045 to 0.050 inches), with a coil diameter of 3¾ to 4 inches, and a coil spacing of 3½ to 4 inches (between adjacent loops of the spiral) has proven most effective.

Several different means 12 for attaching the wire 10 to the perch area are useful. For example, wood staples and tape can be used, but are not preferred. The preferred attachment means is a styrene-based adhesive. A suitable adhesive is available from Eclectic Products Inc. and sold under the brand name Eclectic 6000. This material provides a very durable, paintable, highly abrasion resistant attachment means.

To attach the apparatus to the perch location, the appropriate size wire and coil size are selected. The wire is strung out along the perch location until the proper spacing of coils is achieved. The wire piece is then temporarily secured at either end. This can be accomplished with any suitable material, but a small piece of heavy tape 16 is effective. The preferred adhesive material is applied to each spot where the wire contacts the perch surface.

Adjacent lengths of wire can be secured together by means of small metal crimps 18 so as to provide a continuous spiral or wire along the entire length of the perch area 14.

Although the invention hereinafter claimed has been shown and described above with particularity, it will be apparent to those skilled in the art that other modifications upon the embodiments shown and described may be made without departing from the inventive concepts claimed herein. Accordingly, the scope and protection of this patent are not to be limited to the embodiments specifically shown and described above, but are of the full breath and scope of the appended claims.

What is claimed is:

1. An apparatus for deterring birds from landing on a perch location, the apparatus comprising a length of coiled wire; said wire being expanded such that a spiral shape of the wire is achieved; said wire in that shape attached at the ends and intermediate of the ends thereof to the perch location such that the axis of the spiral shape is parallel to the perch location surface; and said wire being of sufficiently light gauge so as not to stably support the weight of the bird to be deterred, but of sufficiently heavy gauge and the individual spirals being of proper size and spacing so as to interfere with the bird's ability to comfortably close its wings, causing it to take flight, said wire having a diameter of not less than 0.005 inches and not more than 0.1 inches, said spirals being not less than 3 inches in diameter, and said wire being expanded such that the adjacent spirals are not less than 2 inches apart.

2. The apparatus of claim 1 wherein said wire is stainless steel.

3. The apparatus of claim 1 wherein said wire is attached to the perch location by mechanical means.

4. The apparatus of claim 1 wherein said wire is attached to the perch location by chemical means.

5. The apparatus of claim 4 wherein said chemical means comprises a styrene-based adhesive material.

6. The apparatus of claim 1 wherein said wire is attached to the perch location by a combination of mechanical and chemical means.

7. The apparatus of claim 1 wherein each said spiral of said wire is attached directly to the perch location.

8. A method for deterring birds from landing on a perch location, the method comprising the steps of expanding a coiled length of wire apart such that it has a continuous spiral shape, and attaching said wire at the ends and at places intermediate of the ends thereof to the perch location, said wire having a gauge diameter of not less than 0.005 inches nor more than 0.1 inches such that the wire in the expanded state will not stably support the weight of the birds to be deterred, said spirals, when attached, having a diameter of not less that 3 inches, and adjacent spirals being spaced not less that 2 inches apart, such that the birds to be deterred cannot alight comfortably on or in-between the wire spirals.

9. The method of claim 8 wherein the wire is attached by chemical means.

10. The method of claim 9 wherein said chemical means is a styrene-based adhesive material.

11. The method of claim 8 wherein the wire is attached by mechanical means.

12. The method of claim 8 wherein the wire is attached by a combination of chemical and mechanical means.

13. The method of claim 8 wherein each individual spiral is attached directly to the perch location.

* * * * *